(12) United States Patent
Abe et al.

(10) Patent No.: US 7,695,863 B2
(45) Date of Patent: Apr. 13, 2010

(54) NONAQUEOUS ELECTROLYTE SOLUTION AND LITHIUM SECONDARY BATTERY USING SAME

(75) Inventors: Koji Abe, Yamaguchi (JP); Takaaki Kuwata, Yamaguchi (JP); Hirofumi Takemoto, Yamaguchi (JP)

(73) Assignee: Ube Industries, Ltd., Ube-shi (JP)

( * ) Notice: Subject to any disclaimer, the term of this patent is extended or adjusted under 35 U.S.C. 154(b) by 175 days.

(21) Appl. No.: 11/722,883

(22) PCT Filed: Nov. 24, 2005

(86) PCT No.: PCT/JP2005/021520

§ 371 (c)(1),
(2), (4) Date: Jun. 27, 2007

(87) PCT Pub. No.: WO2006/070546

PCT Pub. Date: Jul. 6, 2006

(65) Prior Publication Data

US 2008/0102377 A1 May 1, 2008

(30) Foreign Application Priority Data

Dec. 27, 2004 (JP) .............................. 2004-376728

(51) Int. Cl.
*H01M 6/04* (2006.01)
(52) U.S. Cl. ................... 429/200; 429/330; 429/332; 429/188; 429/341; 429/343; 429/326
(58) Field of Classification Search ............... 429/326, 429/330, 332, 188, 341, 343, 200
See application file for complete search history.

(56) References Cited

FOREIGN PATENT DOCUMENTS

| JP | 2001-176551 | | 6/2001 |
| JP | 2001 185212 | | 7/2001 |
| JP | 2001 202991 | | 7/2001 |
| JP | 2002-124263 | * | 4/2002 |
| JP | 2002 124263 | | 4/2002 |
| JP | 2002-367674 | * | 12/2002 |

OTHER PUBLICATIONS

U.S. Appl. No. 11/814,372, filed Jul. 20, 2007, Abe, et al.
U.S. Appl. No. 11/596,862, filed Nov. 17, 2006, Abe, et al.
U.S. Appl. No. 10/592,702, filed Sep. 13, 2006, Abe, et al.

* cited by examiner

*Primary Examiner*—Laura S Weiner
(74) *Attorney, Agent, or Firm*—Oblon, Spivak, McClelland, Maier & Neustadt, L.L.P.

(57) ABSTRACT

The present invention provides a lithium secondary battery having excellent battery cycle property, electrical capacity, storage characteristic and other battery characteristics for a long period of time, and a nonaqueous electrolytic solution which is usable for the lithium secondary battery.

A nonaqueous electrolytic solution in which an electrolyte salt is dissolved in a nonaqueous solvent, comprising (i) a dicarbonyl compound represented by the general formula (I), or (ii) a dicarbonyl compound represented by the general formula (II) and vinylene carbonate and the like in the nonaqueous electrolytic solution.

[Chemical formula 1]

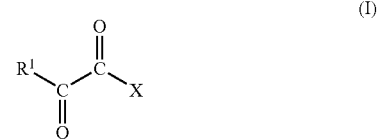

(I)

(wherein $R^1$ represents a hydrogen atom, an alkyl group, an alkenyl group, a phenyl group or the like; and X represents a hydrogen atom, an $R^2$ group or an $OR^2$ group. $R^2$ represents an alkyl group, an alkenyl group, a phenyl group or the like.)

[Chemical formula 2]

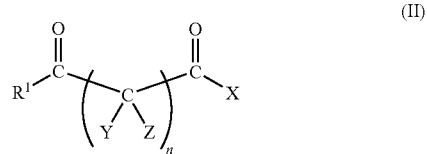

(II)

(wherein $R^1$ and X are the same as above; Y and Z represents a hydrogen atom, an $R^2$ group, an $OR^2$ group, a $COR^2$ group or a $CH_2COR^2$ group; and n is 1 to 6.).

10 Claims, No Drawings

NONAQUEOUS ELECTROLYTE SOLUTION AND LITHIUM SECONDARY BATTERY USING SAME

TECHNICAL FIELD

The present invention relates to a nonaqueous electrolytic solution which can provide a lithium secondary battery having excellent battery characteristics such as battery cycle property, electrical capacity and storage characteristics, and to a lithium secondary battery using the same.

BACKGROUND ART

In recent years, lithium secondary batteries have been widely used as power supplies for driving small electronic devices and the like. Lithium secondary batteries are mainly constituted of a positive electrode, a nonaqueous electrolytic solution and a negative electrode. In particular, lithium secondary batteries constituted of a positive electrode comprised of a lithium compound oxide such as $LiCoO_2$ and a negative electrode comprised of a carbon material or a lithium metal are used. As the nonaqueous electrolytic solution for such lithium secondary batteries, a carbonate such as ethylene carbonate (EC) or propylene carbonate (PC) is used.

However, secondary batteries having better battery characteristics, i.e., battery cycle properties, electrical capacities and the like, are required.

In a lithium secondary battery using, for example, $LiCoO_2$, $LiMn_2O_4$, or $LiNiO_2$ as the positive electrode, part of a solvent in a nonaqueous electrolyte locally decomposes oxidatively during charging, and the decomposition products inhibit a desirable electrochemical reaction of the battery, thereby lowering the battery performance. This is thought to result from the electrochemical oxidation of the solvent at the interface between the positive electrode material and nonaqueous electrolytic solution.

Moreover, in a lithium secondary battery using, for example, natural graphite, artificial graphite and like highly crystallized carbon materials as the negative electrode, a solvent in a nonaqueous electrolytic solution reductively decomposes on the surface of the negative electrode during charging. Therefore, part of ethylene carbonate (EC) which is generally and widely used as a nonaqueous electrolytic solution solvent is reductively decomposed through repeated charging and discharging, thereby lowering the battery performance. Especially, propylene carbonate (PC) having a low melting point and a high dielectric constant, which is preferably used as a nonaqueous solvent since it has a high electric conductivity at low temperatures, cannot be used as a lithium secondary battery because of its very high level of decomposition.

Various suggestions have been made to improve the battery characteristics of this lithium secondary battery.

For example, Patent Document 1 discloses an electrolytic solution containing the first solvent such as propylene carbonate, the second solvent such as dimethyl carbonate, and vinylene carbonate in an amount of 0.01 to 10% by weight of a solvent mixture. Moreover, Patent Document 2 discloses an electrolytic solution containing 0.1 to 5% by weight of vinylene carbonate and asymmetrical linear carbonate.

Patent Document 3 suggests a nonaqueous solvent containing a cyclic carbonate and a linear carbonate as main ingredients and 1,3-propane sultone added thereto, and discloses the improvement of cycle property by adding 1,3-propane sultone.

Patent Document 4 discloses a nonaqueous electrolytic solution containing diketones such as ethyl levulinate and acetonylactone. Patent Document 5 discloses a nonaqueous electrolytic solution containing diketones such as acetylacetone.

Moreover, Patent Document 6 discloses a lithium secondary battery having the density of the layer of a positive electrode mixture of 3.3 to 3.7 $g/cm^3$ and the density of the layer of a negative electrode mixture of 1.4 to 1.8 $g/cm^3$.

As mentioned above, in known lithium secondary batteries having relatively low capacities, battery characteristics such as cycle properties are somewhat improved by adding vinylene carbonate, 1,3-propane sultone and other substances.

However, the techniques of Patent Documents 1 to 6 cannot provide satisfactory battery characteristics required for high-capacity lithium secondary batteries of these days, especially lithium secondary batteries with high-density layers of the positive electrode mixture and negative electrode mixture. An electrolytic solution having an even higher long-term cycle property is thus required.

[Patent Document 1] Japanese Unexamined Patent Publication No. H08-45545
[Patent Document 2] Japanese Unexamined Patent Publication No. H11-185806
[Patent Document 3] Japanese Unexamined Patent Publication No. 2000-3724
[Patent Document 4] Japanese Unexamined Patent Publication No. 2001-176551
[Patent Document 5] Japanese Unexamined Patent Publication No. 2001-185212
[Patent Document 6] Japanese Unexamined patent publication No. 2003-142075

DISCLOSURE OF THE INVENTION

An object of the present invention is to solve the above-mentioned problems, and to provide a nonaqueous electrolytic solution which can constitute a lithium secondary battery having excellent battery cycle property, and further excellent electrical capacity, storage characteristic during charging and other battery characteristics, and to provide a lithium secondary battery using the same.

The inventors of the present invention conducted a research to achieve the above objects. As a result, they found that the above objects can be achieved by adding a specific dicarbonyl compound to a nonaqueous electrolytic solution as an additive.

Thus, the present invention provides the following items (1) to (3):

(1) A nonaqueous electrolytic solution for lithium secondary batteries in which an electrolyte salt is dissolved in a nonaqueous solvent, comprising a dicarbonyl compound represented by the following general formula (I) in the nonaqueous electrolytic solution.

[Chemical formula 1]

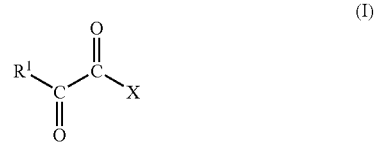

(wherein $R^1$ represents a hydrogen atom, a $C_1$ to $C_{12}$ alkyl group, a $C_3$ to $C_8$ cycloalkyl group, a $C_2$ to $C_{12}$ alkenyl group, a $C_2$ to $C_{12}$ alkynyl group or an unsubstituted or substituted phenyl group; and X represents a hydrogen atom, an $R^2$ group or an $OR^2$ group. $R^2$ represents a $C_1$ to $C_{12}$ alkyl group, a $C_3$ to $C_8$ cycloalkyl group, a $C_2$ to $C_{12}$ alkenyl group, a $C_2$ to $C_{12}$ alkynyl group or an unsubstituted or substituted phenyl group.)

(2) A nonaqueous electrolytic solution for lithium secondary batteries in which an electrolyte salt is dissolved in a nonaqueous solvent, comprising 0.01 to 10% by weight of a dicarbonyl compound represented by the following general formula (II) and at least one member selected from vinylene carbonate, vinylethylene carbonate, fluoroethylene carbonate, 1,3-propane sultone and glycol sulfite.

[Chemical formula 2]

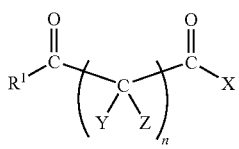

(II)

(wherein $R^1$ and X are the same as above, each of Y and Z independently represents a hydrogen atom, an $R^2$ group, an $OR^2$ group, a $COR^2$ group or a $CH_2COR^2$ group ($R^2$ is the same as above). n represents an integer from 1 to 6; when n is 2 or more, Y and Z bonding to different carbons are independent from each other. $R^1$, X, Y and Z may bond to each other to form a ring.)

(3) A lithium secondary battery comprising a positive electrode, a negative electrode and the nonaqueous electrolytic solution of (1) or (2) above.

According to the present invention, a lithium secondary battery having excellent battery cycle property, electrical capacity, storage characteristic and other battery characteristics can be provided.

In particular, in the present invention, a nonaqueous electrolytic solution containing (i) a specific dicarbonyl compound, or (ii) a specific dicarbonyl compound and vinylene carbonate (VC) or the like in combination as an additive is used, whereby the cycle property is improved particularly for a long period of time in a lithium secondary battery with an increased density of the layer of a positive electrode mixture and the layer of a negative electrode mixture. Moreover, the nonaqueous electrolytic solution of the present invention can be also used suitably as a nonaqueous electrolytic solution for known lithium secondary batteries having relatively low capacities.

BEST MODE FOR CARRYING OUT THE INVENTION

The nonaqueous electrolytic solution for lithium secondary batteries of the present invention is a nonaqueous electrolytic solution in which an electrolyte salt is dissolved in a nonaqueous solvent, comprising (i) a dicarbonyl compound represented by the following general formula (I), or (ii) a dicarbonyl compound represented by the following general formula (II) and at least one member selected from vinylene carbonate (VC), vinylethylene carbonate (VEC), fluoroethylene carbonate (FEC), 1,3-propane sultone (PS) and glycol sulfite (GS).

[Chemical formula 3]

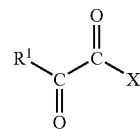

(I)

[Chemical formula 4]

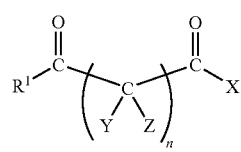

(II)

In the present invention, it was found that when the nonaqueous electrolytic solution obtained by adding the dicarbonyl compound mentioned above to the nonaqueous electrolytic solution is used for a high-capacity lithium secondary battery, the cycle property, which has been an object to be improved, is excellent. Although its mechanism is unknown, it is presumably because a strong coating is formed on the negative electrode by using the dicarbonyl compound mentioned above.

Specific embodiments of the present invention will be described below.

$R^1$ and $R^2$ of X of the dicarbonyl compound represented by the general formula (I) is a hydrogen atom; a $C_1$ $C_{12}$, preferably $C_1$ to $C_8$, especially preferably $C_1$ to $C_4$ alkyl group which may be branched; a $C_3$ to $C_8$, preferably $C_3$ to $C_6$, especially preferably $C_5$ to $C_6$ cycloalkyl group; a $C_2$ to $C_{12}$, preferably $C_2$ to $C_8$, especially preferably $C_2$ to $C_8$ alkenyl group which may be branched; a $C_2$ to $C_{12}$, preferably $C_2$ to $C_8$, especially preferably $C_2$ to $C_6$ alkynyl group which may be branched; or an unsubstituted or a substituted phenyl group.

(i) Specific Examples when X in the General Formula (I) is an Hydrogen Atom

When $R^1$ is a hydrogen atom, Examples include 2-oxoethanal. When $R^1$ is an alkyl group examples include 2-oxopropanal, 2-oxobutanal, 3-methyl-2-oxobutanal, 3,3-dimethyl-2-oxobutanal and the like. When $R^1$ is a cycloalkyl group, examples include 2-cyclopentyl-2-oxoethanal, 2-cyclohexyl-2-oxoethanal and the like.

When $R^1$ is an alkenyl group, examples include 2-oxo-3-butenal, 2-oxo-4-pentenal, (1'-cyclohexenyl)-2-oxoethanal, (2'-cyclohexenyl)-2-oxoethanal and the like. When $R^1$ is an alkynyl group, examples include 2-oxo-3-butynal or the like.

When $R^1$ is an unsubstituted or a substituted phenyl group, examples include 2-oxo-2-phenylethanal, 2-tolyl-2-oxoethanal, 2-(4'-isopropylphenyl)-2-oxoethanal, 2-(4'-t-butylphenyl)-2-oxoethanal and the like.

Among the aldehyde compounds mentioned above, 2-oxopropanal, 2-oxobutanal, 3-methyl-2-oxobutanal, 3,3-dimethyl-2-oxobutanal, 2-oxo-3-butenal are preferable.

(ii) Specific Examples when X in the General Formula (I) is $R^2$=Alkyl Group

When $R^1$ is an alkyl group, examples include diacetyl, 2,3-pentanedione, 4-methyl-2,3-pentanedione, 4,4-dimethyl-2,3-pentanedione, 1-cyclohexyl-1,2-propanedione or the like. When $R^1$ is an alkenyl group, examples include 4-pentene-2,3-dione, 5-hexene-2,3-dione, 1-(1'-cyclohexenyl)-1,2-propanedione, 1-(2'-cyclohexenyl)-1,2-propanedione and the like. When $R^1$ is an alkynyl group, examples include 4-pentyne-2,3-dione, 5-hexyne-2,3-dione and the like.

When $R^1$ is an unsubstituted or a substituted phenyl group, examples include 1-phenyl-1,2-propanedione, 1-tolyl-1,2-propanedione, 1-(4'-isopropylphenyl)-1,2-propanedione, 1-(4'-t-butylphenyl)-1,2-propanedione or the like.

When $R^1$ and X bond to each other to form a ring, examples include 1,2-cyclobutanedione, 1,2-cyclopentanedione, 1,2-cyclohexanedione and the like.

Among the saturated diketone compounds mentioned above, diacetyl, 2,3-pentanedione, 4-methyl-2,3-pentanedione, 4,4-dimethyl-2,3-pentanedione, 4-pentene-2,3-dione, 5-hexene-2,3-dione, 4-pentyne-2,3-dione, 5-hexyne-2,3-dione, 1,2-cyclobutanedione, 1,2-cyclopentanedione and 1,2-cyclohexanedione are preferable.

(iii) Specific Examples when X in the General Formula (I) is $R^2$=Cycloalkyl Group When $R^1$ is a cycloalkyl group, examples include 1,2-dicyclohexyl-1,2-dione and the like. When $R^1$ is an alkenyl group, examples include 1-cyclohexyl-2-hexadiene-1,2-ethanedione and the like. When $R^1$ is an alkynyl group, examples include 1-cyclohexyl-2-hexadiyne-1,2-ethanedione and the like. When $R^1$ is an unsubstituted or a substituted phenyl group, examples include 1-cyclohexyl-2-phenyl-1,2-ethanedione and the like.

(iv) Specific Examples when X in the General Formula (I) is $R^2$=Alkenyl Group

When $R^1$ is an alkenyl group, examples include 1,5-hexadiene-3,4-dione, 1,6-heptadiene-3,4-dione, 1,7-octadiene-4,5-dione, 1-(1'-cyclohexenyl)-3-butene-1,2-dione, 1-(1'-cyclohexenyl)-4-pentene-1,2-dione and the like. When $R^1$ is an alkynyl group, examples include 5-hexene-1-yne-3,4-dione, 1-heptene-6-yne-3,4-dione and the like. When $R^1$ is an unsubstituted or a substituted phenyl group, examples include 1-phenyl-3-butene-1,2-dione and the like.

Among the diketone compound having a carbon-carbon double bond mentioned above, 1,5-hexadiene-3,4-dione, 5-hexene-1yne-3,4-dione and 1-phenyl-3-butene-1,2-dione are preferable.

(v) Specific Examples when X in the General Formula (I) is $R^2$=Alkynyl Group

When $R^1$ is an alkynyl group, examples include 1,5-hexadiyne-3,4-dione, 1,6-heptadiyne-3,4-dione and the like. When $R^1$ is an unsubstituted or a substituted phenyl group, examples include 1-phenyl-3-butyne-1,2-dione, 1-phenyl-4-pentyne-1,2-dione and the like.

Among the diketone compounds having a carbon-carbon triple bond mentioned above, 1,5-hexadiyne-3,4-dione and 1,6-heptadiyne-3,4-dione are preferable.

(vi) Specific Examples when X in the General Formula (I) is $R^2$=an Unsubstituted or a Substituted Phenyl Group When $R^1$ is an unsubstituted or a substituted phenyl group, examples include 1,2-diphenyl-1,2-ethanedione, 1-phenyl-2-tolyl-1,2-ethanedione and the like (vii) Specific Examples when X in the General Formula (I) is an $OR^2$ Group When $R^1$ is an alkyl group, examples include methyl pyruvate, ethyl pyruvate, propyl pyruvate, isopropyl pyruvate, butyl pyruvate, t-butyl pyruvate, vinyl pyruvate, allyl pyruvate, ethynyl pyruvate, 2-propynyl pyruvate and the like. When $R^1$ is a cycloalkyl group, examples include cyclohexyl pyruvate and the like. When $R^1$ is an alkenyl group, examples include hexadiene pyruvate and the like. When $R^1$ is an alkynyl group, examples include methyl 2-oxo-but-3-ynoate, methyl 2-oxo-pent-4-ynoate and the like. When $R^1$ is an unsubstituted or a substituted phenyl group, examples include methyl 2-oxo-2-phenylethanoate and the like.

When $R^1$ and X bond to each other to from a ring, examples include oxetane-2,3-dione, dihydrofuran-2,3-dione, dihydropyran-2,3-dione, methyl cyclobutanone-2-carboxylate, methyl cyclopentanone-2-carboxylate, ethyl cyclohexanone-2-carboxylate and the like.

Among the keto ester compounds mentioned above, methyl pyruvate, ethyl pyruvate, propyl pyruvate, isopropyl pyruvate, butyl pyruvate, t-butyl pyruvate, vinyl pyruvate, allyl pyruvate, ethynyl pyruvate, 2-propynyl pyruvate, oxetane-2,3-dione, dihydrofuran-2,3-dione, dihydropyran-2,3-dione, methyl cyclopentanone-2-carboxylate and the ethyl cyclohexanone-2-carboxylate are preferable.

Among the dicarbonyl compounds represented by the general formula (I), diacetyl, 1,2-cyclohexanedione, methyl pyruvate, ethyl pyruvate, propyl pyruvate, butyl pyruvate, ethynyl pyruvate and 2-propynyl pyruvate are particularly preferable.

$R^1$ and $R^2$ of X, Y and Z of the dicarbonyl compound represented by the general formula (II) are each a hydrogen atom; a $C_1$ to $C_{12}$, preferably $C_1$ to $C_8$, especially preferably $C_1$ to $C_4$ alkyl group which may be branched; a $C_3$ to $C_8$, preferably $C_3$ to $C_6$, especially preferably $C_5$ to $C_6$ cycloalkyl group; a $C_2$ to $C_{12}$, preferably $C_2$ to $C_8$, especially preferably $C_2$ to $C_8$ alkenyl group which may be branched; a $C_2$ to $C_{12}$, preferably $C_2$ to $C_8$, especially preferably $C_2$ to $C_6$ alkynyl group which may be branched; or an unsubstituted or a substituted phenyl group.

$R^1$ and X, $R^1$ and Y, $R^1$ and Z, X and Y, X and Z, Y and Z may bond to each other to form a ring.

(viii) Specific Example when X in the General Formula (II) is a Hydrogen Atom

When $R^1$ is a hydrogen atom, examples include malonaldehyde, succinic aldehyde and the like. When $R^1$ is an alkyl group, examples include 3-oxobutanal, 4-oxopentanal, 4-oxohexanal, 5-methyl-4-oxohexanal, 5,5-dimethyl-4-oxohexanal, 4-cyclohexyl-4-oxobutanal, 5-oxohexanal, 6-oxoheptanal, 7-oxooctanal, 8-oxononanal and the like.

When $R^1$ is an alkenyl group, examples include 4-oxo-5-hexenal, 4-oxo-6-heptenal and the like. When $R^1$ is an alkynyl group, examples include 4-oxo-5-hexynal, 4-oxo-6-heptynal and the like. When $R^1$ is an unsubstituted or a substituted phenyl group, examples include 4-oxo-4-phenyl butanal, 2-tolyl-4-oxobutanal, 4-(4'-isopropylphenyl)-4-oxobutanal, 4-(4'-t-butylphenyl)-4-oxobutanal and the like.

When $R^1$, Y and Z bond to each other to form a ring, examples include 2-oxocyclobutanecarboxaldehyde, 3-oxocyclobutanecarboxaldehyde, 2-oxocyclopentanecarboxaldehyde, 3-oxocyclopentanecarboxaldehyde, 2-oxocyclohexanecarboxaldehyde, 3-oxocyclohexanecarboxaldehyde, 4-oxocyclohexanecarboxaldehyde and the like.

(ix) Specific Examples when X of the General Formula (II) is $R^2$=Alkyl Group

When $R^1$ is an alkyl group, examples include saturate diketone compounds such as acetylacetone, acetonylacetone, 2,5-heptanedione, 6-methyl-2,5-heptanedione, 6,6-dimethyl-2,5-heptanedione, 1-cyclohexyl-1,4-pentanedione, 2,6-heptanedione, 2,7-octanedione, 2,8-nonanedione, 2,9-decanedione and the like.

When $R^1$ is an alkenyl group, examples include 6-heptene-2,5-dione, 7-octene-2,5-dione, 1-(1'cyclohexenyl)-1,4-pentenedione, 1-(2'-cyclohexenyl)-1,4-pentene dione and the like. When $R^1$ is an alkynyl group, examples include 6-heptyne-2,5-dione, 7-octyne-2,5-dione and the like. When $R^1$ is an unsubstituted or a substituted phenyl group, examples include 1-phenyl-1,4-pentanedione, 1-tolyl-1,4-pentanedione, 1-(4'-isopropylphenyl)-1,4-pentanedione, 1-(4'-t-butylphenyl)-1,4-pentanedione and the like.

When $R^1$, Y and Z bond to each other to form a ring, examples include 1,3-cyclobutanedione, 1,3-cyclopentanedione, 1,3-cyclohexanedione, 1,4-cyclohexanedione, 2-acetylcyclobutanone, 3-acetylcyclobutanone, 2-acetylcyclopentanone, 3-acetylcyclopentanone, 2-acetylcyclohexanone, 3-acetylcyclohexanone, 4-acetylcyclohexanone and the like.

(x) Specific Examples when X of the General Formula (II) is $R^2$=Alkenyl Group

When $R^1$ is an alkenyl group, examples include 1,7-octadiene-3,6-dione, 1,8-nonadiene-3,6-dione, 1,9-decadiene-4,7-dione, 1-(1'-cyclohexenyl)-5-hexene-1,4-dione, 1-(1'-cyclohexenyl)-6-heptene-1,4-dione and the like. When $R^1$ is an alkynyl group, examples include 7-octene-1-yne-3,6-dione, 1-nonene-8-yne-3,6-dione and the like. When $R^1$ is an unsubstituted or a substituted phenyl group, examples include 1-phenyl-5-hexene-1,4-dione and the like.

When $R^1$, Y and Z bond to each other to form a ring, examples include 5-acetyl-2-cyclopentenone, 6-acetyl-2-cyclohexenone, 2-(1'-oxo-2'-propenyl)cyclopentanone and the like.

(xi) Specific Examples when X of the General Formula (II) is $R^2$=Alkynyl Group When $R^1$ is an alkynyl group, examples include 1,7-octadiyne-4,5-dione, 1,7-octadiyne-3,6-dione, 1,8-nonadiyne-3,6-dione, 1,9-decadiyne-4,7-dione and the like. When $R^1$ is an unsubstituted or a substituted phenyl group, examples include 1-phenyl-5-hexyne-1,4-dione, 1-phenyl-6-heptyne-1,4-dione and the like.

When $R^1$, Y and Z bond to each other to form a ring, examples include 2-(1'-oxo-2'propynyl)cyclopentanone, 2-(1'-oxo-3'-butynyl)cyclopentanone and the like.

(xii) Specific Examples when X of the General Formula (II) is $R^2$=an Unsubstituted or a Substituted Phenyl Group When $R^1$ is an unsubstituted or a substituted phenyl group, examples include 1,4-diphenyl-1,4-butanedione and the like.

(xiii) Specific Examples when X of the General Formula (II) is an $OR^2$ Group

When $R^1$ is an alkyl group, examples include keto ester compounds such as methyl acetoacetate, methyl diacetoacetate, ethyl diacetoacetate, methyl levulinate, ethyl levulinate, propyl levulinate, isopropyl levulinate, butyl levulinate, t-butyl levulinate, vinyl levulinate, allyl levulinate, ethynyl levulinate, 2-propynyl levulinate, methyl 5-oxohexanoate, methyl 6-oxoheptanoate, methyl 7-oxooctanoate, methyl 8-oxononanoate and the like.

When $R^1$ is an alkenyl group, examples include 2-oxo-3-methyl butenoate, 2-oxo-4-methyl pentenoate, 4-oxo-5-methyl hexenoate, 4-oxo-6-methyl heptenoate and the like. When $R^1$ is an alkynyl group, examples include 4-oxo-5-methyl hexynoate, 4-oxo-6-methyl heptynoate and the like. When $R^1$ is an unsubstituted or a substituted phenyl group, examples include 4-oxo-4-methyl phenylbutanoate and the like.

When $R^1$, Y and Z bond to each other to form a ring, examples include 2-formylcyclopropaneethyl carboxylate, dihydrofuran-2,4-dione, dihydropyran-2,4-dione, dihydropyran-2,5-dione, methyl cyclobutanone-3-carboxylate, ethyl cyclopentanone-2-carboxylate, methyl cyclopentanone-3carboxylate, methyl cyclohexanone-2-carboxylate, methyl cyclohexanone-3-carboxylate, methyl cyclohexanone-4carboxylate, ethyl cyclohexanone-4-carboxylate, 2-acetyl-γ-butyrolactone, 3-acetyl-γ-butyrolactone, 4-acetyl-γ-butyrolactone, 2-acetonyl-γ-butyrolactone, 3-acetonyl-γ-butyrolactone, 4-acetonyl-γ-butyrolactone, 2-(3'-oxobutyl)-γ-butyrolactone, 3-(3'-oxobutyl)-γ-butyrolactone, 4-(3'-oxobutyl)-γ-butyrolactone, 2-acetyl-δ-valerolactone, 3-acetyl-δ-valerolactone, 4-acetyl-δ-valerolactone, 5-acetyl-δ-valerolactone, 2-acetonyl-δ-valerolactone, 3-acetonyl-δ-valerolactone, 4-acetonyl-δ-valerolactone, 5-acetonyl-δvalerolactone, 2-(3'-oxobutyl)-δ-valerolactone, 3-(3'-oxobutyl)-δvalerolactone, 4-(3'oxobutyl)-δ-valerolactone, 5-(3'oxobutyl)-δvalerolactone and the like.

(xiv) Specific Examples when X of the General Formula (II) is a $COR^2$ Group

Examples include 2,3,5-hexanetrione, 1,4-dicarboethoxycyclopentane-2,3-dione, ethyl 2,3,5-trioxo-1-cyclopentane glyoxylate and the like.

(xv) Specific Examples when X of the General Formula (II) is $CH_2COR^2$ group

Examples include 2,4,6-heptatrione, 3,5-diacetyltetrahydropyran-2,4,6-trione, hexamethylcyclohexane-1,3,5-trione, 1,5-diphenyl-1,3,5,-pentanetrione and the like.

Among the dicarbonyl compounds represented by the general formula (II), compounds which are reductively decomposed at a potential higher than vinylene carbonate are preferable. Among these, compounds in which n in the general formula (II) is 1 to 4 are preferable, and compounds in which n is 1 to 2 are particularly preferable. Moreover, compounds in which X in the general formula (II) is an $R^2$ group or $OR^2$ group are preferable. In these compounds, substituents for the $R^2$ group and $OR^2$ are more preferably a $C_1$ to $C_{12}$, even more preferably $C_1$ to $C_8$, especially preferably $C_1$ to $C_4$ alkyl group which may be branched; a $C_3$ to $C_8$, even more preferably $C_3$ to $C_6$, especially preferably $C_5$ to $C_6$ cycloalkyl group; a $C_2$ to $C_{12}$, even more preferably $C_2$ to $C_8$, especially preferably $C_2$ to $C_4$ alkenyl group which may be branched; or a $c_2$ to $c_{12}$, even more preferably $C_2$ to $C_8$, especially preferably $C_2$ to $C_6$ alkynyl group which may be branched.

Especially preferable dicarbonyl compounds represented by the general formula (II) include acetylacetone, acetonylacetone, 1,3-cyclopentanedione, 1,3-cyclohexanedione, 1,4-cyclohexanedione, 2-acetylcyclopentanone, 3-acetylcyclopentanone, 2-acetylcyclohexanone, methyl diacetoacetate, ethyl diacetoacetate, methyl levulinate, ethyl levulinate, 2-propynyl levulinate, dihydrofuran-2,4-dione, ethyl cyclopentanone-2-carboxylate, methyl cyclopentanone-3-carboxylate, ethyl cyclohexanone-2-carboxylate, methyl cyclohexanone-3-carboxylate, ethyl cyclohexanone-4-carboxylate and 2-acetyl-γ-butyrolactone and succinic aldehyde.

Examples of most preferable compounds include methyl levulinate, ethyl levulinate and 2-propynyl levulinate which are compounds in which the value of n is 2, cyclic diketone compounds such as 1,3-cyclopentanedione, 1,3-cyclohexanedione and 1,4-cyclohexanedione (n=2), cyclic ketone compounds which have an exocyclic carbonyl substituent, such as 2-acetylcyclopentanone, 2-acetylcyclohexanone, cyclopentanone-2-ethyl carboxylate, cyclopentanone-3-methyl carboxylate (n=2), cyclohexanone-2-ethyl carboxylate, cyclohexanone-3-methyl carboxylate (n=2), cyclohexanone-4-ethyl carboxylate, lactone compounds which have a cyclic ketone group such as 2-acetyl-γ-butyrolactone and other cyclic diketone compounds.

The effects of dicarbonyl compounds represented by the general formula (I) and (II) are unknown, but it is assumed that a strong coating is formed on the negative electrode (i) by using a dicarbonyl compound represented by the general formula (I), or (ii) by using a specific amount of a dicarbonyl compound represented by the general formula (II) and a specific amount of at least one member selected from vinylene carbonate (VC), vinylethylene carbonate (VEC), fluoroethylene carbonate (FEC), 1,3-propane sultone (PS), and glycol sulfite (GS) in combination.

If the contained amount of a dicarbonyl compound represented by the general formulae (I) and (II) is too high, the electric conductivity and other properties of the electrolytic solution are changed and thus the battery performance may be lowered. Therefore, the amount of the dicarbonyl compound is preferably not higher than 10% by weight, particularly preferably not higher than 5% by weight, and most preferably not higher than 3% by weight based on the weight of the nonaqueous electrolytic solution. Moreover, if the amount is too low, sufficient coating is not formed, and desired battery characteristics cannot be obtained. Therefore, the amount of the dicarbonyl compound is preferably not lower than 0.01% by weight, particularly preferably not lower than 0.05% by weight, and most preferably not lower than 0.1% by weight based on the weight of the nonaqueous electrolytic solution.

Moreover, if the contained amount of vinylene carbonate (VC), vinylethylene carbonate (VEC), fluoroethylene carbonate (FEC), 1,3-propane sultone (PS) or glycol sulfite (GS) which can be contained in the nonaqueous electrolytic solution in combination with the dicarbonyl compound is too high, the electric conductivity and other properties of the electrolytic solution are changed and thus the battery performance may be lowered. Therefore, the amount is preferably not higher than 10% by volume based on the volume of the nonaqueous solvent, particularly preferably not higher than 5% by volume, and most preferably not higher than 3% by volume. Moreover, if the amount is too low, a sufficient coating is not formed and desired battery characteristics cannot be obtained. Therefore, the amount is preferably not lower than 0.01% by volume, particularly preferably not lower than 0.1% by volume, and most preferably not lower than 0.5% by volume based on the volume of the nonaqueous solvent.

These additives can be used singly or in combination of two or more kinds.

[Nonaqueous Solvent]

Examples of nonaqueous solvents used for the nonaqueous electrolytic solution of the present invention include cyclic carbonates, linear carbonates, linear esters, ethers, amides, phosphates, sulfones, lactones, nitriles, compounds containing $S=O$ and the like.

Examples of cyclic carbonates include ethylene carbonate (EC), propylene carbonate (PC), butylene carbonate, dimethylvinylene carbonate, vinylethylene carbonate and the like. Particularly, a cyclic carbonate containing EC having a high dielectric constant is the most preferable.

Examples of linear carbonates include asymmetrical linear carbonates such as methyl ethyl carbonate (MEC), methyl propyl carbonate, methyl butyl carbonate, ethyl propyl carbonate, and symmetrical linear carbonates such as dimethyl carbonate (DMC), diethyl carbonate (DEC), dipropyl carbonate, dibutyl carbonate and the like.

Moreover, examples of linear esters include methyl propionate, methyl pivalate, butyl pivalate, hexyl pivalate, octyl pivalate, dimethyl oxalate, ethyl methyl oxalate, diethyl oxalate and the like. Examples of ethers include tetrahydrofuran, 2-methyltetrahydrofuran, 1,4-dioxane, 1,2-dimethoxyethane, 1,2-diethoxyethane, 1,2-dibutoxyethane and the like. Examples of amides include dimethyl formamide and the like. Examples of phosphates include trimethyl phosphate, tributyl phosphate, trioctyl phosphate and the like.

Examples of sulfones include divinyl sulfone and the like. Examples of lactones include γ-butyrolactone, δ-valerolactone, α-angelicalactone and the like, Examples of nitriles include acetonitrile, adiponitrile and the like.

Examples of $S=O$-containing compounds include sulfate ester compounds such as 1,4-propanesultone, 1,4-butanediol dimethane sulfonate, propylene sulfite, glycol sulfate, propylene sulfate, dipropargyl sulfite, methyl propargyl sulfite and ethyl propargyl sulfite, and divinyl sulfone and the like.

Among the $S=O$-containing compounds, sulfate ester compounds such as 1,4-butanediol dimethane sulfonate, propylene sulfite, glycol sulfate and propylene sulfate, and divinyl sulfone are preferably used in combination.

The above-mentioned nonaqueous solvents are normally used as mixtures to achieve appropriate properties. Examples of combinations of the solvents include the combinations of a cyclic carbonate and a linear carbonate, combinations of a cyclic carbonate and a lactone, combinations of a lactone and a linear ester, combinations of a cyclic carbonate, a lactone and a linear ester, combinations of a cyclic carbonate, a linear carbonate and a lactone, combinations of a cyclic carbonate and an ether, combinations of a cyclic carbonate, a linear carbonate and an ether, combinations of a cyclic carbonate, a linear carbonate and a linear ester and various other combinations.

In these combinations, the ratio of the solvents mixed is not particularly limited. In the case of combinations including lactones, lactones are preferably used in the combinations in an amount higher than any other components by volume.

Among these, combinations of a cyclic carbonate and a linear carbonate are preferable. More specifically, combinations of a cyclic carbonate such as EC and PC and a linear carbonate such as methyl ethyl carbonate (MEC), dimethyl carbonate (DMC) and diethyl carbonate (DEC) are particularly preferable.

The ratio of a cyclic carbonate to a linear carbonate is preferably the cyclic carbonate:linear carbonate (volume ratio)=20:80 to 40:60, and particularly preferably 25:75 to 35:65.

Moreover, among the linear carbonates, asymmetrical carbonates such as MEC, methyl propyl carbonate and methyl butyl carbonate are preferably used. Particularly, it is preferable to use MEC which is liquid at low temperatures and thus has low evaporation because of its relatively high boiling point. Furthermore, the ratio by volume of MEC, which is an asymmetrical linear carbonate, to DMC and/or DEC, which are symmetrical linear carbonates is preferably 100/0 to 51/49, and more preferably 100/0 to 70/30.

[Electrolyte Salt]

Examples of electrolyte salts for use in the present invention include lithium salts containing a linear alkyl group such as $LiPF_6$, $LiBF_4$, $LiClO_4$, $LiN(SO_2CF_3)_2$, $LiN(SO_2C_2F_5)_2$, $LiCF_3SO_3$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, and lithium salts containing a cyclic alkylene group such as $(CF_2)_2(SO_2)_2NLi$, $(CF_2)_3(SO_2)_2NLi$ and the like.

Among these, particularly preferable electrolyte salts are $LiPF_6$, $LiBF_4$ and $LiN(SO_2CF_3)_2$, and the most preferable electrolyte salt is $LiPF_6$. These electrolyte salts can be used singly or in combination of two or more kinds.

Electrolyte salts can be mixed at any ratio. Examples of suitable combinations include the combination of $LiPF_6$ and $LiBF_4$, the combination of $LiPF_6$ and $LiN(SO_2CF_3)_2$, the combination of $LiBF_4$ and $LiN(SO_2CF_3)_2$ and the like. The combination of $LiPF_6$ and $LiBF_4$ is particularly preferable. A preferable ratio is $LiPF_6$:$LiBF_4$ (volume ratio)=80:20 to 99:1, and a particularly preferable ratio is 90:10 to 98:2.

Moreover, when one of $LiPF_6$, $LiBF_4$ and $LiN(SO_2CF_3)_2$ is selected as a first electrolyte salt and another electrolyte salt is used in combination as a second electrolyte salt, the amount of the second electrolyte salt based on the entire electrolyte salts is preferably 0.01 mol % or more, more preferably 0.03% or more, and most preferably 0.05% or more. The upper limit of the amount is preferably 45% or less, more preferably 20% or less, even more preferably 10% or less, and most preferably 5% or less.

The concentration of these electrolyte salts dissolved and used is normally 0.3 M or more, more preferably 0.5 M or more, and most preferably 0.7 M or more based on the nonaqueous solvent. The upper limit of the concentration is preferably 3 M or less, more preferably 2.5 M or less, and most preferably 2 M or less.

Examples of the most preferably combinations of the nonaqueous solvent and electrolyte salt include an electrolytic solution containing $LiPF_6$ and/or $LiBF_4$ as an electrolyte salt combined with a solvent mixture comprising (i) EC and/or PC, (ii) at least one member selected from VC, VEC, FEC, PS and GS, and (iii) at least one member selected from MEC, DMC and DEC.

More specifically, it is preferable to combine a solvent mixture having the ratio by volume of the (i):(ii):(iii)=10:0.2: 89.8 to 40:10:50, preferably 20:0.5:79.5 to 35:5:60, more preferably 25:1:74 to 32:3:65 and an electrolyte salt having the ratio of $LiPF_6$:$LiBF_4$ (molar ratio)=100:0 to 55:45, preferably 99.8:0.2 to 75:25, even more preferably 99.5:0.5 to 85:15, and most preferably 99:1 to 90:10.

[Preparation of Nonaqueous Electrolytic Solution]

The nonaqueous electrolytic solution of the present invention can be obtained, for example, by mixing nonaqueous solvents such as EC, PC, MEC and DMC mentioned above, dissolving the above-mentioned electrolyte salts in the mixture, and dissolving (i) the dicarbonyl compound represented by the general formula (I), or (ii) the dicarbonyl compound represented by the general formula (II) and at least one member selected from VC, VEC, FEC, PS and GS in the solution.

At this time, it is preferable that the used nonaqueous solvents, dicarbonyl compounds represented by the general formula (I) or (II), VC, VEC, FEC, PS, or GS and other additives are purified in advance to reduce impurities therein as much as possible within the range the productivity is not significantly lowered.

Gas generation due to decomposition of the electrolytic solution can be inhibited and long-term cycle property, charge storage characteristic and other battery characteristics can be improved by incorporating, for example, air and carbon dioxide to the nonaqueous electrolytic solution of the present invention.

As mentioned for incorporating (dissolving) carbon dioxide or air in the nonaqueous electrolytic solution, there may be used (1) a method in which the nonaqueous electrolytic solution is previously contacted with air or a carbon dioxide-containing gas before the solution is poured in the battery; or (2) a method in which after the solution has been poured in the battery, air or a carbon dioxide-containing gas is charged in the battery before or after sealing the battery. It is preferred that the moisture content of the air or carbon dioxide-containing gas is as low as possible and that the air or carbon dioxide-containing gas have a dew point of −40° C. or lower, particularly preferably −50° C. or lower.

In the present invention, from the perspective of improving charge and discharge characteristics at high temperatures, using an electrolytic solution containing carbon dioxide dissolved in the nonaqueous electrolytic solution is particularly preferably. The amount of carbon dioxide dissolved is preferably 0.001% by weight or more, more preferably 0.05% by weight or more, and even more preferably 0.2% by weight or more based on the weight of the nonaqueous electrolytic solution, and most preferably carbon dioxide is dissolved in the nonaqueous electrolytic solution until it is saturated.

[Lithium Secondary Battery]

The lithium secondary battery of the present invention comprises a positive electrode, a negative electrode and a nonaqueous electrolytic solution in which an electrolyte salt is dissolved in a nonaqueous solvent. The positive electrode, negative electrode and other components than the nonaqueous electrolytic solution are not particularly limited, and various known components can be used.

For example, as a positive electrode active material, lithium compound metal oxides containing cobalt, maganese or nickel may be used. These positive electrode active material can be used singly or in combination of two or more kinds.

Examples of such compound metal oxides include $LiCoO_2$, $LiMn_2O_4$, $LiNiO_2$, $LiCo_{1-x}Ni_xO_2(0.01<x<1)$, $LiCo_{1/3}Ni_{1/3}Mn_{1/3}O_2$, $LiNi_{1/2}Mn_{3/2}O_4$, and the like. Moreover, these compound metal oxides may be used in combination, for example, $LiCoO_2$ and $LiMn_2O_4$; $LiCoO_2$ and $LiNiO_2$; and $LiMn_2O_4$ and $LiNiO_2$. Among these, lithium compound metal oxides which are usable at the charge potential of the positive electrode of 4.3 V or higher on Li basis in a state of being fully charged such as $LiCoO_2$, $LiMn_2O_4$, and $LiNiO_2$ are preferable, and lithium compound oxides which are usable at 4.4 V or higher such as $LiCo_{1/3}Ni_{1/3}Mn_{1/3}O_2$ and $LiNi_{1/2}Mn_{3/2}O_4$ are more preferable. Moreover, lithium compound oxides may be partially substituted with other elements. For example, some of Co in $LiCoO_2$ may be substituted with Sn, Mg, Fe, Ti, Al, Zr, Cr, V, Ga, Zn, Cu or others.

Moreover, a lithium-containing olivine type phosphoric salt can be used as a positive electrode active material. Specific examples include $LiFePO_4$, $LiCoPO_4$, $LiNiPO_4$, $LiMnPO_4$, $LiFe_{1-x}M_xPO_4$ (M is at least one member selected from Co, Ni, Mn, Cu, Zn and Cd; and x is $0 \leq x \leq 0.5$) and the like. Among these, $LiFePO_4$ and $LiCoPO_4$ are preferable as positive electrode active material for high voltages.

Lithium-containing olivine type phosphoric salts can be mixed and used with other positive electrode active material.

Conductive materials of the positive electrode are not particularly limited and may be any electronic conductive material which does not cause a chemical change. Examples include graphites such as natural graphite (scaly graphite, etc.) and artificial graphite, and carbon blacks such as acetylene black, ketchen black, channel black, furnace black, lamp black and thermal black. Moreover, graphites and carbon blacks may be appropriately mixed and used in combination. The amount of the conductive material added to the positive electrode active material is preferably 1 to 10% by weight, and particularly preferably 2 to 5% by weight.

The positive electrode can be prepared by mixing a positive electrode active material with a conductive material such as acetylene black and carbon black, and a binder such a polytetrafluoroethylene, polyvinylidene fluoride, styrene-butadiene copolymer, acrylonitrile-butadiene copolymer, carboxymethylcellulose and ethylene-propylene-diene terpolymer, adding a solvent having a high boiling point such as 1-methyl-2-pyrrolidone to this mixture, kneading the mixture to prepare a positive electrode mixture, rolling this positive electrode material on a lath board made of an aluminium foil or stainless steel as a collector, and heating the board at a temperature of about 50° C. to 250° C. for about 2 hours in vacuo.

As the negative electrode (negative electrode active material), lithium metal, lithium alloy, carbon materials [thermally decomposed carbon materials, cokes, graphites (artificial graphites, natural graphites, etc.), fired organic polymer bodies, carbon fibers] which can adsorb and release lithium, tin, tin compounds, silicon, silicon compounds can be used singly or in combination of two or more kinds. The battery capacity can be increased by substituting part or all of the carbon materials with tin, tin compounds, silicon or silicon compounds.

Among these, carbon materials are preferable, and carbon materials having crystalline structures of the graphite type in which the lattice spacing ($d_{002}$) of lattice faces (002) is 0.340 nm or less, particularly 0.335 to 0.340 nm are more preferable.

The negative electrode can be produced by using the same binders and solvents having high boiling points as those used in the production method of the positive electrode mentioned above in a similar manner.

In the present invention, the density of the layer of the electrode material is preferably increased to increase the effect of adding pentafluorophenyloxy compounds represented by the general formula (II) or (III). Particularly, the density of the positive electrode (positive electrode layer) formed on an aluminium foil is preferably 3.2 g/cm$^3$ or higher, more preferably 3.3 g/cm$^3$ or higher, and most preferably 3.4 g/cm$^3$ or higher. The density higher than 4.0 g/cm$^3$ may make the practical production difficult. Therefore, the upper limit of the density is preferably 4.0 g/cm$^3$ or lower, more preferably 3.9 g/cm$^3$ or lower, and most preferably 3.8 g/cm$^3$ or lower.

On the other hand, the density of the negative electrode (negative electrode layer) formed on a copper foil is preferably 1.3 g/cm$^3$ or higher, more preferably 1.4 g/cm$^3$ or higher, and most preferably 1.5 g/cm$^3$ or higher. A density higher than 2.0 g/cm$^3$ may make the practical production of the negative electrode difficult. Therefore, the upper limit of the density is preferably 2.0 g/cm$^3$ or lower, more preferably 1.9 g/cm$^3$ or lower, and most preferably 1.8 g/cm$^3$ or lower.

If the layer of the positive electrode material is too thin, the amount of the active material in the layer of the electrode material is lowered and the battery capacity is reduced. Therefore, the thickness of the positive electrode layer (per side of the collector) is preferably 30 μm or more, and more preferably 50 μm or more. Moreover, if the thickness is too large, the cycle property of charging and discharging and rate characteristics are undesirably lowered. Accordingly, the thickness of the electrode layer of the positive electrode is preferably 120 μm or less, and more preferably 100 μm or less.

If the thickness of the negative electrode layer (per side of the collector) is too small, the amount of the active material in the layer of the electrode material is lowered and the battery capacity is reduced. Therefore, the thickness is preferably 1 μm or more, and more preferably 3 μm. Moreover, if the thickness is too large, the cycle property of charging and discharging and rate characteristics are undesirably lowered. Accordingly, the thickness of the electrode layer of the negative electrode is preferably 100 μm or less, and more preferably 70 μm or less.

The structure of the lithium secondary battery is not particularly limited, and coin-shaped batteries, cylindrical batteries, square-shaped batteries, laminate batteries and other structures having a single-layer or multi-layer separator can be applied.

As a separator for batteries, single-layer or laminate porous films of polyolefins such as polypropylene and polyethylene, woven fabrics, nonwoven fabrics and the like can be used.

Although varying depending on the manufacturing conditions, if the air permeability of the separator for batteries is too high, the lithium ion conductivity is lowered, and the functions as a separator for batteries become insufficient. For this reason, the air permeability is preferably 1000 sec./100 cc or lower, more preferably 800 sec./100 cc or lower, and most preferably 500 sec./100 cc or lower. On the other hand, if the air permeability is too low, the mechanical strength is lowered. Therefore, the air permeability is preferably 50 sec./100 cc or higher, more preferably 100 sec./100 cc or higher, and most preferably 300 sec./100 cc or higher. The porosity of the separator is preferably 30 to 60%, more preferably 35 to 55% or higher, and most preferably 40 to 50% or higher, from the perspective of improving the battery capacity characteristics.

Furthermore, the smaller the thickness of the separator for batteries is, the higher the energy density can be. Therefore, the thickness of the separator is preferably 50 μm or less, more preferably 40 μm or less, and most preferably 25 μm or less. Moreover, in terms of its mechanical strength, the thickness is preferably 5 μm or more, more preferably 10 μm or more, and most preferably 15 μm or more.

The lithium secondary battery in the present invention has an excellent cycle property for a long period of time even when the end-of-charge voltage is 4.2 V or higher and particularly 4.3 V or higher, and the cycle property is also good at 4.4 V. The end-of-discharge voltage can be 2.5 V or higher, or 2.8 V or higher. Although the current value is not particularly limited, it is normally used at a constant current discharge of 0.1 to 3 C. Moreover, the lithium secondary battery in the present invention can be charged and discharged at −40° C. or higher, and preferably 0° C. or higher. Moreover, it can be charged and discharged at 100° C. or lower, preferably 80° C. or lower.

In the present invention, as a measure for an increase in the internal pressure of the lithium secondary battery, methods of providing a safety valve in a sealing plate and making a slit in a battery can, gasket and other component parts can be also employed.

A plurality of the lithium secondary batteries in the present invention are, if necessary, accommodated in a battery pack and arranged serially and/or in parallel. The battery pack is preferably provided with at least one of overcurrent protection elements such as PTC elements, temperature fuses and bimetals, safety circuits (circuits having functions of monitoring the voltage, temperature, current, etc. of each battery and/or entire battery pack and shutting off a current) and the like.

EXAMPLE

The present invention will be descried below in more detail with reference to Examples and Comparative Examples. It should be noted that the present invention is not limited to these Examples, and various combinations which can be readily assumed from the principles of the invention are possible. In particular, the combinations of the solvents of the Examples described below are not limited.

[Production of the Negative Electrode]

Ninety-five % by weight of an artificial graphite (negative electrode active material) which has a graphite-type crystalline structure having the lattice spacing ($d_{002}$) of lattice faces (002) of 0.335 nm and 5% by weight of polyvinylidene fluoride (binder) were mixed. A solvent of 1-methyl-2-pyrrolidone was added to this mixture and mixed. This mixture was applied on a copper foil, dried, press-molded and heated, producing a negative electrode.

[Production of Positive Electrode]

Ninety-four % by weight of $LiCo_{1/3}Ni_{1/3}Mn_{1/3}O_2$ (positive electrode active material), 3% by weight of acetylene black (conductive material) and 3% by weight of polyvinylidene fluoride (binder) were mixed. A solvent of 1-methyl-2-pyrrolidone was added to this mixture and mixed. This mixture was applied on an aluminium foil, dried, press-molded and heated, producing a positive electrode.

EXAMPLE 1

[Preparation of the Nonaqueous Electrolytic Solution]

A nonaqueous solvent in which ethylene carbonate (EC):methyl ethyl carbonate (MEC) (volume ratio)=30:70 was prepared. $LiPF_6$ was dissolved in this solvent as an electrolyte salt in a concentration of 1 M to prepare a nonaqueous electrolytic solution. Methyl pyruvate was then added to the solution as an additive in an amount of 1% by weight of the nonaqueous electrolytic solution.

[Production of Cylindrical Lithium Secondary Battery and Measurement of Battery Characteristics]

An 18650 size cylindrical battery (diameter: 18 mm, height: 65 mm) was produced by using a separator of a polyethylene microporous film (thickness: 20 μm), pouring the above-mentioned nonaqueous electrolytic solution into the battery, and then introducing air having a dew point of −60° C. into the battery before the battery was sealed. The battery was provided with a pressure release vent and an internal current breaker (PTC element). At this time, the electrode density of the positive electrode was 3.5 g/cm³, and the electrode density of the negative electrode was 1.6 g/cm³. The thickness of the positive electrode layer (per side of the collector) was 65 μm, and the thickness of the negative electrode layer (per side of the collector) was 70 μm.

This 18650 battery was charged to 4.2 V at 25° C. and at a constant current of 2.2 A (1C), and was then charged for the total of three hours at a constant voltage with an end-of-charge voltage of 4.2 V. Subsequently, the battery was discharged to an end-of-charge voltage of 3.0 V at a constant current of 2.2 A (1C). The cycle of charging and discharging was repeated. The capacity retention rate was determined from the ratio of the discharge capacity after 200 cycles to the initial discharge capacity. The production conditions of the cylindrical battery and battery characteristics are shown in Table 1.

COMPARATIVE EXAMPLE 1

A cylindrical battery was produced and its battery characteristics were determined in a manner similar to Example 1 except that no additives were used. The results are shown in Table 1.

COMPARATIVE EXAMPLE 2

A cylindrical battery was produced and its batter characteristics were determined in a manner similar to Example 1 except that acetylacetone was used as an additive in an amount of 1% by weight. The results are shown in Table 1.

EXAMPLE 2

A cylindrical battery was produced and its battery characteristics were determined in a manner similar to Example 1 except that a nonaqueous solvent of propylene carbonate (PC):dimethyl carbonate (DMC) (volume ratio)=1:2 was prepared, and $LiPF_6$ was dissolved in this solvent as an electrolyte salt in a concentration of 1 M to prepare a nonaqueous electrolytic solution, and then 2-propynyl pyruvate was used as an additive in an amount of 1% by weight of the nonaqueous electrolytic solution. The results are shown in Table 1.

COMPARATIVE EXAMPLE 3

A cylindrical battery was produced and its battery characteristics were determined in a manner similar to Example 2 except that no additives were used. The results are shown in Table 1.

EXAMPLE 3

A cylindrical battery was produced and its battery characteristics were determined in a manner similar to Example 1 except that a nonaqueous solvent of ethylene carbonate (EC):vinylene carbonate (VC):methyl ethyl carbonate (MEC) (volume ratio)=30:2:68 was prepared, $LiPF_6$ was dissolved in this solvent as an electrolyte salt in a concentration of 1 M to prepare a nonaqueous electrolytic solution, and then ethyl pyruvate was used as an additive in an amount of 1% by weight of the nonaqueous electrolytic solution. The results are shown in Table 1.

EXAMPLE 4

A cylindrical battery was produced and its battery characteristics were determined in a manner similar to Example 3 except that diacetyl was used as an additive in an amount of 1% by weight of the nonaqueous electrolytic solution. The results are shown in Table 1.

COMPARATIVE EXAMPLE 4

A cylindrical battery was produced and its battery characteristics were determined in a manner similar to Example 3 except that no additives were used. The results are shown in Table 1.

EXAMPLE 5

A cylindrical battery was produced and its battery characteristics were determined in a manner similar to Example 1 except that a nonaqueous solvent of propylene carbonate (PC):vinylene carbonate (VC):dimethyl carbonate (DMC) (volume ratio)=33:1:66 was prepared, $LiPF_6$ was dissolved in this solvent as an electrolyte salt in a concentration of 1 M to prepare a nonaqueous electrolytic solution, and then 2-propynyl pyruvate was used as an additive in an amount of 1% by weight of the nonaqueous electrolytic solution. The results are shown in Table 1.

EXAMPLE 6

A cylindrical battery was produced and its battery characteristics were determined in a manner similar to Example 1 except that a nonaqueous solvent of ethylene carbonate (EC):1,3-propane sultone (PS):methyl ethyl carbonate (MEC) (volume ratio)=30:2:68 was prepared, $LiPF_6$ was dissolved in this solvent as an electrolyte salt in a concentration of 1 M to prepare a nonaqueous electrolytic solution, and then methyl levulinate was used as an additive in an amount of 1% by weight of the nonaqueous electrolytic solution. The results are shown in Table 1.

COMPARATIVE EXAMPLE 5

A cylindrical battery was produced and its battery characteristics were determined in a manner similar to Example 6 except that no additives were used. The results are shown in Table 1.

COMPARATIVE EXAMPLE 7

A cylindrical battery was produced and its battery characteristics were determined in a manner similar to Example 15 except that a solvent of ethylene carbonate (EC):methyl ethyl

TABLE 1

| | Positive electrode | Electrolyte salt | Composition of electrolytic solution (volume ratio) | Additive | Amount added (weight %) | Discharge capacity retention after 200 cycles |
|---|---|---|---|---|---|---|
| Ex. 1 | $LiCo_{1/3}Ni_{1/3}Mn_{1/3}O_2$ | 1 M $LiPF_6$ | EC/MEC = 30/70 | Methyl pyruvate | 1 | 75.3% |
| Comp. Ex. 1 | $LiCo_{1/3}Ni_{1/3}Mn_{1/3}O_2$ | 1 M $LiPF_6$ | EC/MEC = 30/70 | None | — | 70.8% |
| Comp. Ex. 2 | $LiCo_{1/3}Ni_{1/3}Mn_{1/3}O_2$ | 1 M $LiPF_6$ | EC/MEC = 30/70 | Acetylacetone | 1 | 71.3% |
| Ex. 2 | $LiCo_{1/3}Ni_{1/3}Mn_{1/3}O_2$ | 1 M $LiPF_6$ | PC/DMC = 1/2 | 2-Propynyl pyruvate | 1 | 76.2% |
| Comp. Ex. 3 | $LiCo_{1/3}Ni_{1/3}Mn_{1/3}O_2$ | 1 M $LiPF_6$ | PC/DMC = 1/2 | None | — | Unchargeable |
| Ex. 3 | $LiCo_{1/3}Ni_{1/3}Mn_{1/3}O_2$ | 1 M $LiPF_6$ | EC/VC/MEC = 30/2/68 | Ethyl pyruvate | 1 | 82.2% |
| Ex. 4 | $LiCo_{1/3}Ni_{1/3}Mn_{1/3}O_2$ | 1 M $LiPF_6$ | EC/VC/MEC = 30/2/68 | Diacetyl | 1 | 81.8% |
| Comp. Ex. 4 | $LiCo_{1/3}Ni_{1/3}Mn_{1/3}O_2$ | 1 M $LiPF_6$ | EC/VC/MEC = 30/2/68 | None | — | 73.7% |
| Ex. 5 | $LiCo_{1/3}Ni_{1/3}Mn_{1/3}O_2$ | 1 M $LiPF_6$ | PC/VC/DMC = 33/1/66 | 2-Propynyl pyruvate | 1 | 78.1% |
| Ex. 6 | $LiCo_{1/3}Ni_{1/3}Mn_{1/3}O_2$ | 1 M $LiPF_6$ | EC/PS/MEC = 30/2/68 | Methyl levulinate | 1 | 82.4% |
| Comp. Ex. 5 | $LiCo_{1/3}Ni_{1/3}Mn_{1/3}O_2$ | 1 M $LiPF_6$ | EC/PS/MEC = 30/2/68 | None | — | 73.3% |

EXAMPLE 7

A cylindrical battery was produced and its battery characteristics were determined in a manner similar to Example 1 except that a nonaqueous solvent of EC:VC:MEC (volume ratio)=30:2:68 was prepared, $LiPF_6$ was dissolved as an electrolyte salt in this solvent in a concentration of 1 M to prepare a nonaqueous electrolytic solution, and then acetonylacetone was used as an additive in an mount of 1% by weight of the nonaqueous electrolytic solution. The results are shown in Table 2.

COMPARATIVE EXAMPLE 6

A cylindrical battery was produced and its battery characteristics were determined in a manner similar to Example 7 except that a solvent of ethylene carbonate (EC):methyl ethyl carbonate (MEC) (volume ratio)=30:70 was used. The results are shown in Table 2.

EXAMPLES 8 to 14

Cylindrical batteries were produced and their battery characteristics were determined in a manner similar to Example 7 except that 1,3-cyclopentanedione, 1,4-cyclohexanedione, 2-acetylcyclopentanone, 2-acetylcyclohexanone, ethyl diacetoacetate, dihydrofuran-2,4-dione and acetylacetone were prepared as additives and added respectively in the amounts shown in Table 2 based on the nonaqueous electrolytic solution. The results are shown in Table 2.

EXAMPLE 15

A cylindrical battery was produced and its battery characteristics were determined in a manner similar to Example 1 except that a nonaqueous solvent of EC:VC:MEC (volume ratio)=30:2:68 was prepared, $LiPF_6$ was dissolved as an electrolyte salt in this solvent in a concentration of 1 M to prepare a nonaqueous electrolytic solution, and then methyl levulinate was used as an additive in an amount of 1% by weight of the nonaqueous electrolytic solution. The results are shown in Table 2.

carbonate (MEC) (volume ratio)=30:70 was used. The results are shown in Table 1.

EXAMPLE 16

A cylindrical battery was produced and its battery characteristics were determined in a manner similar to Example 1 except that $LiCoO_2$ was used as the positive electrode (positive electrode active material) in place of $LiCo_{1/3}Ni_{1/3}Mn_{1/3}O_2$. The results are shown in Table 2.

EXAMPLE 17

A cylindrical battery was produced and its battery characteristics were determined in a manner similar to Example 1 except that a nonaqueous solvent of ethylene carbonate (EC):vinylethylene carbonate (VEC):1,3-propane sultone (PS):m-ethyl ethyl carbonate (MEC) (volume ratio)=30:1:1:68 was prepared. The results are shown in Table 2.

EXAMPLE 18

A cylindrical battery was produced and its battery characteristics were determined in a manner similar to Example 1 except that a nonaqueous solvent of PC:VC:DMC (volume ratio)=33:1:66 was prepared, $LiPF_6$ was dissolved as an electrolyte salt in this solvent in a concentration of 1 M to prepare a nonaqueous electrolytic solution, and than 2-propynyl levulinate was used as an additive in an amount of 1% by weight of the nonaqueous electrolytic solution. The results are shown in Table 2.

EXAMPLE 19

A cylindrical battery was produced and its battery characteristics were determined in a manner similar to Example 1 except that a nonaqueous solvent of EC:VC:MEC (volume ratio)=30:5:65 was prepared, $LiPF_6$ was dissolved as an electrolyte salt in this solvent in a concentration of 1 M to prepare a nonaqueous electrolytic solution, and then succinic aldehyde was used as an additive in an amount of 0.1% by weight of the nonaqueous electrolytic solution. The results are shown in Table 2.

EXAMPLE 20

A cylindrical battery was produced and its battery characteristics were determined in a manner similar to Example 1 except that a nonaqueous solvent of EC:VC:MEC (volume ratio)=30:0.1:69.9 was prepared, $LiPF_6$ was dissolved as an electrolyte salt in this solvent in a concentration of 1 M to prepare a nonaqueous electrolytic solution, and then 2-acetyl-γ-butyrolactone was used as an additive in an amount of 5% by weight of the nonaqueous electrolytic solution. The results are shown in Table 2.

EXAMPLE 21

A cylindrical battery was produced and its battery characteristics were determined in a manner similar to Example 1 except that a nonaqueous solvent of ethylene carbonate (EC): fluoroethylene carbonate (FEC):methyl ethyl carbonate (MEC) (volume ratio)=30:2:68 was prepared, $LiPF_6$ and $LiBF_4$ were dissolved in concentrations of 0.95 M and 0.05 M, respectively, in this solvent as electrolyte salts to prepare a nonaqueous electrolytic solution, and then ethyl cyclopentanone-2-carboxylate was used as an additive in an amount of 1% by weight of the nonaqueous electrolytic solution. The results are shown in Table 2.

EXAMPLE 22

A cylindrical battery was produced and its battery characteristics were determined in a manner similar to Example 1 except that a nonaqueous solvent of ethylene carbonate (EC): glycol sulfite (GS):methyl ethyl carbonate (MEC) (volume ratio)=30:2:68 was prepared, $LiPF_6$ and $LiN(SO_2CF_3)_2$ were dissolved as electrolyte salts in this solvent in concentrations of 0.9 M and 0.1 M respectively to prepare a nonaqueous electrolytic solution, and then ethyl cyclohexanone-4-carboxylate was used as an additive in an amount of 1% by weight of the nonaqueous electrolytic solution. The results are shown in Table 2.

INDUSTRIAL APPLICABILITY

A lithium secondary battery having excellent battery cycle property, electrical capacity, storage characteristic and other battery characteristics can be obtained by using the nonaqueous electrolytic solution of the present invention. The obtained lithium secondary battery can be used suitably as a cylindrical battery, square-shaped battery, coin-shaped battery, laminate battery and other types of batteries.

The invention claimed is:

1. A nonaqueous electrolytic solution for lithium secondary batteries, wherein the nonaqueous electrolytic solution comprises an electrolyte salt dissolved in a nonaqueous solvent, from 0.01 to 10% by weight of a dicarbonyl compound according to formula (II), and at least one member selected from the group consisting of vinylene carbonate, vinylethylene carbonate, fluoroethylene carbonate, 1,3-propane sultone and glycol sulfite in which at least one is present in an amount of from 0.01 to 10% by volume of the nonaqueous solvent:

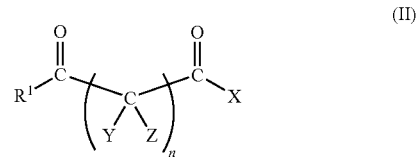

(II)

wherein $R^1$ represents a hydrogen atom, a $C_1$ to $C_{12}$ alkyl group, a $C_3$ to $C_8$ cycloalkyl group, a $C_2$ to $C_{12}$ alkenyl group, a $C_2$ to $C_{12}$ alkynyl group or an unsubstituted or substituted phenyl group; X represents an $OR^2$ group, wherein $R^2$ represents a $C_3$ to $C_8$ cycloalkyl group, a $C_2$ to $C_{12}$ alkenyl group, a $C_2$ to $C_{12}$ alkynyl group or an unsubstituted or substituted phenyl group; Y and Z each independently represent a hydrogen atom, an $R^2$ group, an $OR^2$ group, a $COR^2$ group or a $CH_2COR^2$ group, wherein $R^2$ is the same as defined above; and n repre-

TABLE 2

| Ex. | Positive electrode | Electrolyte salt | Composition of electrolytic solution (volume ratio) | Additive | Amount added (weight %) | discharge capacity retention after 200 cycles |
|---|---|---|---|---|---|---|
| Ex. 7 | $LiCo_{1/3}Ni_{1/3}Mn_{1/3}O_2$ | 1 M $LiPF_6$ | EC/VC/MEC = 30/2/68 | Acetonylacetone | 1 | 84.3% |
| Comp. Ex. 6 | $LiCo_{1/3}Ni_{1/3}Mn_{1/3}O_2$ | 1 M $LiPF_6$ | EC/MEC = 30/70 | Acetonylacetone | 1 | 71.6% |
| Ex. 8 | $LiCo_{1/3}Ni_{1/3}Mn_{1/3}O_2$ | 1 M $LiPF_6$ | EC/VC/MEC = 30/2/68 | 1,3-Cyclopentanedione | 1 | 80.2% |
| Ex. 9 | $LiCo_{1/3}Ni_{1/3}Mn_{1/3}O_2$ | 1 M $LiPF_6$ | EC/VC/MEC = 30/2/68 | 1,4-Cyclohexanedione | 1 | 81.4% |
| Ex. 10 | $LiCo_{1/3}Ni_{1/3}Mn_{1/3}O_2$ | 1 M $LiPF_6$ | EC/VC/MEC = 30/2/68 | 2-Acetylcyclopentanone | 1 | 78.2% |
| Ex. 11 | $LiCo_{1/3}Ni_{1/3}Mn_{1/3}O_2$ | 1 M $LiPF_6$ | EC/VC/MEC = 30/2/68 | 2-Acetylcyclohexanone | 1 | 80.5% |
| Ex. 12 | $LiCo_{1/3}Ni_{1/3}Mn_{1/3}O_2$ | 1 M $LiPF_6$ | EC/VC/MEC = 30/2/68 | Ethyl diacetoacetate | 1 | 79.7% |
| Ex. 13 | $LiCo_{1/3}Ni_{1/3}Mn_{1/3}O_2$ | 1 M $LiPF_6$ | EC/VC/MEC = 30/2/68 | Dihydrofuran-2,4-dione | 1 | 81.5% |
| Ex. 14 | $LiCo_{1/3}Ni_{1/3}Mn_{1/3}O_2$ | 1 M $LiPF_6$ | EC/VC/MEC = 30/2/68 | Acetylacetone | 2 | 80.2% |
| Ex. 15 | $LiCo_{1/3}Ni_{1/3}Mn_{1/3}O_2$ | 1 M $LiPF_6$ | EC/VC/MEC = 30/2/68 | Methyl levulinate | 1 | 84.4% |
| Comp. Ex. 7 | $LiCo_{1/3}Ni_{1/3}Mn_{1/3}O_2$ | 1 M $LiPF_6$ | EC/MEC = 30/70 | Methyl levulinate | 1 | 72.2% |
| Ex. 16 | $LiCoO_2$ | 1 M $LiPF_6$ | EC/VC/MEC = 30/2/68 | Methyl levulinate | 1 | 80.9% |
| Ex. 17 | $LiCo_{1/3}Ni_{1/3}Mn_{1/3}O_2$ | 1 M $LiPF_6$ | EC/VEC/PS/MEC = 30/1/1/68 | Ethyl levulinate | 1 | 82.2% |
| Ex. 18 | $LiCo_{1/3}Ni_{1/3}Mn_{1/3}O_2$ | 1 M $LiPF_6$ | PC/VC/DMC = 33/1/66 | 2-Propynyl levulinate | 1 | 83.4% |
| Ex. 19 | $LiCo_{1/3}Ni_{1/3}Mn_{1/3}O_2$ | 1 M $LiPF_6$ | EC/VC/MEC = 30/5/65 | Succinic aldehyde | 0.1 | 78.7% |
| Ex. 20 | $LiCo_{1/3}Ni_{1/3}Mn_{1/3}O_2$ | 1 M $LiPF_6$ | EC/VC/MEC = 30/0.1/69.9 | 2-Acetyl-γ-butyrolactone | 5 | 79.6% |
| Ex. 21 | $LiCo_{1/3}Ni_{1/3}Mn_{1/3}O_2$ | 0.95 M $LiPF_6$ + 0.05 M $LiBF_4$ | EC/FEC/MEC = 30/2/68 | Ethyl cyclopentanone-2-carboxylate | 1 | 80.1% |
| Ex. 22 | $LiCo_{1/3}Ni_{1/3}Mn_{1/3}O_2$ | 0.9 M $LiPF_6$ + 0.1 M $LiN(SO_2CF_3)_2$ | EC/GS/MEC = 30/2/68 | Ethyl cyclohexanone-4-carboxylate | 1 | 79.6% | sents an integer from 1 to 6; wherein $R^1$ and X, $R^1$ and Y, $R^1$ and Z, X and Y, X and Z, Y and Z, $R^1$, Y and Z, or $R^1$, X, Y and Z, may bond to each other to form a ring, with the proviso that when n is 2 or more, Y and Z each bond to a different carbon atom and are independent from each other.

2. The nonaqueous electrolytic solution for lithium secondary batteries according to claim 1, wherein the dicarbonyl compound according to formula (II) is at least one member selected from a dialdehyde, a keto aldehyde, a diketone and a keto ester.

3. The nonaqueous electrolytic solution for lithium secondary batteries according to claim 1, wherein the dicarbonyl compound according to formula (II) is at least one member selected from a saturated diketone and a keto ester.

4. A lithium secondary battery comprising a positive electrode, a negative electrode and the nonaqueous electrolytic solution according to claim 1.

5. The lithium secondary battery according to claim 4, wherein the positive electrode comprises lithium compound metal oxides comprising at least one selected from the group consisting of cobalt, manganese and nickel as a positive active material.

6. The lithium secondary battery according to claim 4, wherein the negative electrode comprises carbon materials which can absorb and release lithium as a negative electrode material.

7. The nonaqueous electrolytic solution according to claim 1, wherein the nonaqueous electrolytic solution comprises an electrolyte salt dissolved in a nonaqueous solvent, from 0.01 to 10% by weight of a dicarbonyl compound according to formula (II), and at least one member selected from vinylene carbonate, vinylethylene carbonate, fluoroethylene carbonate, 1,3-propane sultone and glycol sulfite:

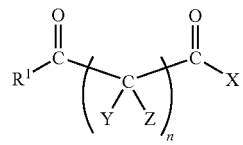

wherein $R^1$ represents a $C^1$ to $C^{12}$ alkyl group; X represents an $OR^2$ group wherein $R^2$ represents a $C^2$ to $C^{12}$ alkynyl group; Y and Z each independently represent a hydrogen atom; and n represents an integer from 1 to 6, and wherein $R^1$ and X, $R^1$ and Y, $R^1$ and Z, X and Y, X and Z, Y and Z, $R^1$, Y and Z, or $R^1$, X, Y and Z, may bond to each other to form a ring, with the proviso that when n is 2 or more, Y and Z each bond to a different carbon atom and are independent from each other.

8. The nonaqueous electrolytic solution according to claim 7, wherein the nonaqueous solvent comprises a cyclic carbonate and a linear carbonate.

9. The nonaqueous electrolytic solution according to claim 8, wherein the linear carbonate comprises at least one asymmetrical carbonate selected from the group consisting of methyl ethyl carbonate, methyl propyl carbonate and methyl butyl carbonate.

10. The nonaqueous electrolytic solution according to claim 7, wherein the dicarbonyl compound according to formula (II) is at least one of ethynyl levulinate and 2-propynyl levulinate.

* * * * *